W. B. A. SPRAY.
AUXILIARY AIR SUPPLY FOR INTERNAL COMBUSTION ENGINES.
APPLICATION FILED DEC. 30, 1915. RENEWED NOV. 6, 1916.

1,211,636. Patented Jan. 9, 1917.

WITNESS
Charles J. Diller.

INVENTOR
W. B. A. Spray.
BY
Fred J. Dieterich &Co
ATTORNEYS

UNITED STATES PATENT OFFICE.

WILLIAM B. A. SPRAY, OF VANCOUVER, BRITISH COLUMBIA, CANADA.

AUXILIARY AIR-SUPPLY FOR INTERNAL-COMBUSTION ENGINES.

1,211,636. Specification of Letters Patent. Patented Jan. 9, 1917.

Application filed December 30, 1915, Serial No. 69,449. Renewed November 6, 1916. Serial No. 129,908.

*To all whom it may concern:*

Be it known that I, WILLIAM B. A. SPRAY, a subject of the King of Great Britain, residing at Vancouver, in the Province of British Columbia, Canada, have invented certain new and useful Improvements in Auxiliary Air-Supplies for Internal-Combustion Engines, of which the following is a specification.

This invention relates to a means for controlling the admission of a supplementary supply of air to an internal combustion engine whereby the amount of air so applied is automatically regulated to the flow of fuel to the engine.

Many devices are in use in which attempt has been made to proportionate an auxiliary supply of air to the requirements of the engine, either by a manually operated valve or by one mechanically operated coöperatively with the movement of the throttle valve or otherwise, but all with which I am acquainted are ineffective in that the amount of air admitted is not directly controlled by the demand of the engine on its fuel supply.

In the device, which is the subject of this application, the valve which admits the supplementary supply of atmospheric air to the engine is automatically operated to control the amount of air so admitted by the changing vacuum existing in the gas delivery duct to the engine below the throttle valve which regulates that gas delivery, that is, between the throttle and the source of fuel supply. As it is the vacuum existing in the induction pipe which induces the flow of gaseous fuel, if the throttle is opened to admit the gaseous fuel the vacuum existing below the throttle will be a measure of the amount of gas which it is required to supply to the engine and this vacuum, below the throttle, is therefore the controlling agent to regulate how far the supplementary air supply valve shall be opened to deliver air to the induction pipe, which delivery is made on the opposite or engine side of the gas throttle valve.

Figure 1:
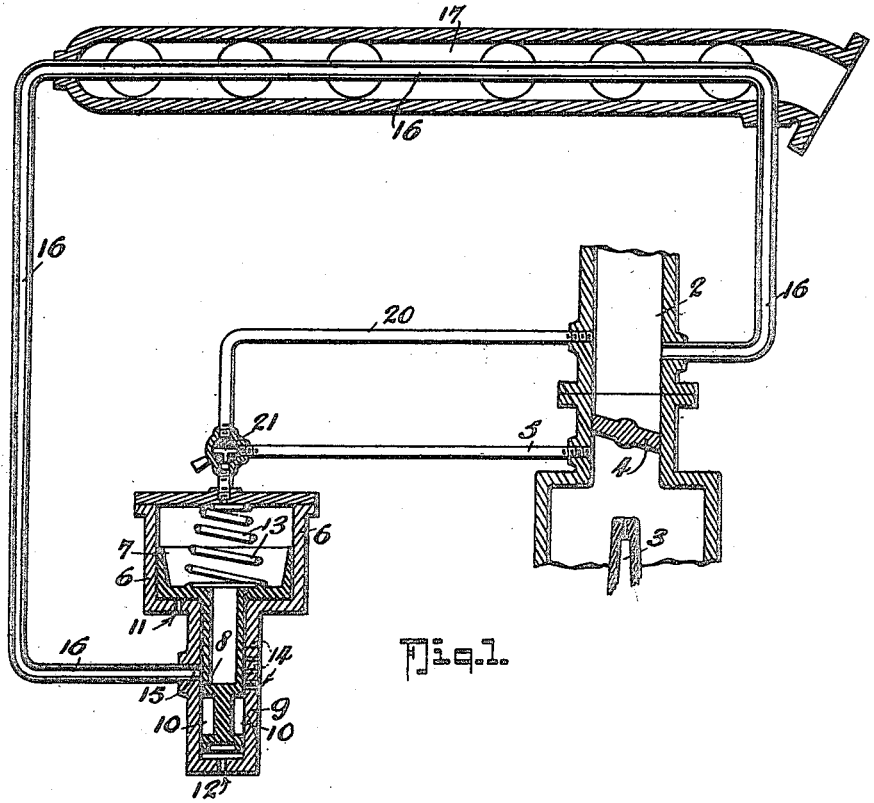
Figure 2:
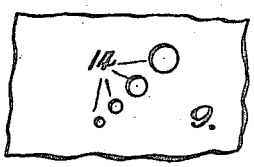
Figure 3:
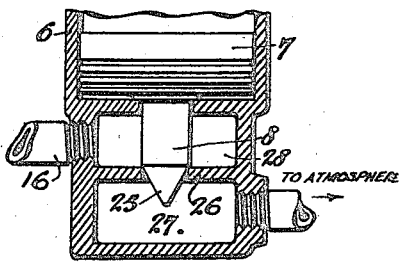

The invention is particularly described in the following specification, reference being made to the drawings by which it is accompanied, in which:

Figure 1 shows the device in longitudinal section as connected to the induction pipe of an engine. Fig. 2, a development showing the arrangement of the atmospheric air inlets, and Fig. 3 shows in section a modification of the supplementary air supply valve.

In these drawings 2 represents the induction pipe through which gas is supplied to the engine, and 3 the nozzle of the carbureter, 4 being the throttle valve by which the admission of gas from the carbureter to the engine is regulated.

From a position on the atmospheric side of, and preferably adjacent the throttle valve 4, a small pipe 5 connects the space below the valve with the upper end of a small cylinder 6 in which is endwise movable, against the resistance of a light spring 13, a hollow piston 7, which piston has a hollow stem 8 projecting from it which slidably fits a reduced extension 9 of the cylinder 6, and adjacent its lower end has an annular chambering 10. In the bottom end of the cylinder 6 opposite the connection of the pipe 5 a small vent 11 is provided and a similar vent 12 in the lower end of the extension 9. In the extension 9, which is adjacent the cylinder 6, and above the position of the annular recess 10 of the stem 8 when the piston is in its normal position, is a series of inlet apertures 14 progressively enlarging toward the cylinder until the total area of all the apertures approximately corresponds to that of a port 15 on the opposite side of the extension 9, to which port 15 is connected a pipe 16, the other end of which is connected to the induction pipe 2 immediately above the throttle 4. This pipe 16 may pass through the exhaust chamber 17 or be otherwise exposed to a heating agency. With this arrangement, as the throttle 4 is opened to admit gas to the engine, the partial vacuum induced adjacent the throttle will act through the pipe 5 and space in casing 6 above the piston, upon the light piston 7 of the cylinder 6, and will lift that piston against the light resistance of the spring 13 and bring the annular chamber 10 formed in the stem 8 of the piston, to connect one or more of the air inlets 14 to the air delivery port 15 on the opposite side. The amount of air admitted to the induction pipe will thus be dependent on the vacuum prevailing below the throttle, which again will be dependent on the amount the throttle is opened and to the speed the engine is running at. The supplementary supply of atmospheric air will thus be properly proportioned to the flow of fuel to the engine, and that air, if desired, may be heated by passage through the exhaust chamber 17, so that it will be in a favorable condition for effective combustion, and will vaporize any gas which may have condensed in the induction pipe.

It will be noted that as the areas of the stem 8 exposed to end pressure in the annular chamber 10 are balanced they cannot act to affect the movement of the piston. Further the air vents 11 and 12 being small in relation to the area of the piston 6 and the end of its stem 8 will prevent too rapid movement of the piston either in opening or closing the air supply ports.

The essential feature of the invention lies in the connection of the supplementary air valve control to the fuel delivery to the engine below the throttle valve 4, whereby the amount of supplementary air admitted to the engine is directly controlled by the vacuum below the throttle, and therefore to the flow of fuel in response thereto.

In the modification shown in Fig. 3 a seated valve is used instead of the piston cut-off of the apertures 14 by the stem 8. The hollow stem 8 of the piston 7 is here formed with a conical end 25 which seats as a valve in the aperture of a partition 26 between a chamber 27 to which the atmosphere is admitted and a chamber 28 which is in communication with the induction pipe 2 of the engine by a pipe 16.

As a supplementary feature, a pipe 20 may be connected from the induction pipe 2 above the throttle valve and to the pipe 5 with a manually operated three-way valve 21 at the connection to that pipe, so that when the supplementary supply of air controlled by the changing vacuum below the throttle is not required for combustion, as when the car is running down hill, the pipe 5 may be cut off from the cylinder 6 and the connection to it established with the induction pipe 2, the constant vacuum in which will draw the piston 7 to the full upward limit of its movement and admit a full supply of air to the cylinders, which air will be drawn in and compressed, and will afford an effective brake in going down an incline. In other words, if control of the supplementary air admitted to the induction pipe is effected by the vacuum on the atmospheric side of the throttle, as when the cylinder 6 is in communication with the pipe 5, the amount of air admitted will be automatically proportioned to the requirements of the engine, but if it is derived from the engine side of the throttle valve, as when the cylinder is connected through the pipe 20, a maximum amount of air will be delivered to the induction pipe and will serve the desired object as a brake to the engine.

Having now particularly described my invention, I hereby declare that what I claim as new and desire to be protected in by Letters Patent, is:

1. In combination with the carbureter and the intake pipe between the carbureter and the engine, said carbureter having a throttle valve; of a duct for delivering auxiliary air into the manifold on the engine side of the throttle valve, means governed by the suction produced on the carbureter side of the throttle valve for controlling the flow of auxiliary air through said duct.

2. In an internal combustion engine, the combination with an induction pipe through which gaseous fuel is delivered to the engine and the throttle valve regulating such admission, of a pipe delivering a supplementary supply of air to the induction pipe on the engine side of the throttle valve, a valve controlling the amount of air delivered through the pipe, means for holding that air control valve normally closed, and means operative by the partial vacuum on the atmospheric side of the throttle valve for opening the air control valve.

3. In an internal combustion engine, the combination with the induction pipe through which the gaseous fuel is delivered to the engine and the throttle valve regulating such admission, of a pipe delivering a supplementary supply of air to the induction pipe on the engine side of the throttle valve, a valve controlling the amount of air so delivered, means for holding that air control valve normally closed, and a piston connected to the valve which piston is endwise movable in a cylinder, and means for connecting the cylinder to the atmospheric side of the throttle valve whereby the partial vacuum therein will open the valve.

4. In an internal combustion engine, the combination with the carbureter having a throttle valve and the induction pipe between the carbureter and the engine through which the gaseous mixture is delivered to the engine, of an air admission valve, a duct governed by said air admission valve for delivering auxiliary air into the induction pipe between the throttle valve and the engine, said air valve including a vacuum chamber, a duct between said vacuum chamber and the delivery end of the carbureter on the carbureter side of the throttle valve.

5. In an internal combustion engine, the combination with the carbureter having a throttle valve and the induction pipe between the carbureter and the engine through which the gaseous mixture is delivered to the engine, of an air admission valve, a duct governed by said air admission valve for delivering auxiliary air into the induction pipe between the throttle valve and the engine, said air valve including a vacuum chamber, a duct between said vacuum chamber and the delivery end of the carbureter on the carbureter side of the throttle valve, and a supplemental duct between said vacuum chamber and the induction pipe on the engine side of said throttle valve, and a three-way valve for effecting communication between said vacuum chamber and the respective ducts.

6. In combination with a carbureter, the induction pipe from the carbureter to the engine and the carbureter throttle valve; of a separate auxiliary air valve, said auxiliary air valve including a casing, air ports in said casing, a valve for controlling said air ports, a duct between said air ports and said casing and the induction pipe, said casing including a suction chamber coöperative with said air valve, a duct between said suction chamber and said carbureter side of the throttle valve whereby air may be admitted to the induction pipe according to the vacuum on the carbureter side of the throttle valve, and an auxiliary duct between said suction chamber and said induction pipe whereby said air valve may be opened to supply air to the induction pipe when said throttle valve is closed, and means for controlling the suction through the respective ducts that communicate with the suction chamber.

In testimony whereof I affix my signature.

WILLIAM B. A. SPRAY.